United States Patent [19]
Faber

[11] Patent Number: 4,796,139
[45] Date of Patent: Jan. 3, 1989

[54] DISC CASSETTE

[75] Inventor: Johannes W. Faber, Eindhoven, Netherlands

[73] Assignee: U.S. Philips Corporation, New York, N.Y.

[21] Appl. No.: 139,155

[22] Filed: Dec. 23, 1987

Related U.S. Application Data

[63] Continuation of Ser. No. 843,896, Mar. 25, 1986, abandoned.

[30] Foreign Application Priority Data

Nov. 25, 1985 [NL] Netherlands ............ 8503236

[51] Int. Cl.⁴ ............................................. G11B 23/03
[52] U.S. Cl. ...................................... 360/133; 206/444; 369/282
[58] Field of Search ................ 360/133; 206/444, 309; 369/282, 291

[56] References Cited

U.S. PATENT DOCUMENTS

| 4,481,552 | 11/1984 | Dona | 360/133 |
| 4,571,718 | 2/1986 | Cahill | 360/133 |
| 4,636,904 | 1/1987 | Matsuno | 360/133 |

FOREIGN PATENT DOCUMENTS 2103862 2/1983 United Kingdom.

Primary Examiner—A. J. Heinz
Attorney, Agent, or Firm—F. Brice Faller

[57] ABSTRACT

An information medium comprises an information disc 1 which can be rotated inside the enclosure 5 and which carries a hub 2 which extends through an opening 9 in a main wall 6 of the enclosure with some clearance. Radial displacements of the information disc are limited by elastic means between the hub and the edge 23 of the central opening in the main wall.

6 Claims, 2 Drawing Sheets

DISC CASSETTE

This is a continuation of application Ser. No. 843,896, filed Mar. 25, 1986, now abandoned.

FIELD OF THE INVENTION

The invention relates to an information medium including an information disc having a central hub to cooperate with a drive spindle and an enclosure having at least one main wall formed with a central opening for the passage of the hub with some clearance.

Information media of this type are used for the permanent or temporary storage of audio and/or video information and of digital information supplied to or by computers. The information disc may have a magnetizable surface which can be inscribed or read by suitable magnetic-head means. Other known information disc are optically readable by means of a radiation beam. During their manufacture optically readable information discs may be provided with an optically readable structure containing audio, video or other information, for example computer programs. Such information discs are optically readable but generally the user cannot record inforamtion on the disc. In some known optically readable discs, however, this is possible but, depending on the type of radiation-sensitive layer used, the information disc can be inscribed but cannot be erased or it can both be inscribed and erased. The latter type of optically readable information discs include magnetooptical information discs.

DESCRIPTION OF THE PRIOR ART

An information medium of the type defined in the opening paragraph is described in the Applicants' previous patent application Ser. No. 666,025, filed Oct. 29, 1984 herewith incorporated by reference), which has not been published in due time.

The problem associated with information media of the present and similar types is that during handling and transport of the information medium the information disc and/or the enclosure may become damaged as a result of impact and shocks. In order to enable it to be rotated inside the enclosure there must be some clearance between the information disc and the enclosure. Therefore, when the information medium is not situated on a drive means, relative movements are possible between the information disc and the enclosure, which as already stated may give rise to damage and may also cause undesirable rattling sounds.

It has been proposed to immobilise an information disc in an enclosure relative to this enclosure by clamping means. Since the information disc on the drive means should be rotatable relative to the enclosure, the clamping device should be operable from the exterior of the enclosure in order to release the disc. This leads to an increased number of parts and consequently a more intricate construction and a higher cost price of the information medium. Preferably the clamping means are actuated automatically when the information medium is inserted into the drive means. This implies that the drive means also becomes more intricate. Although this is in itself preferably avoided, an increase in cost price of the information medium is generally considered to be more undesirable. Indeed, for every drive means many information media are purchased, whilst moreover the cost price increase per information medium is proportionally larger than that per drive means.

SUMMARY OF THE INVENTION

It is the object of the invention to provide information media of the type defined in the opening paragraph with a minimal number of parts and at low cost but without any problems as a result of relative movements between the information disc and the enclosure. To this end the hub cooperates with the edge of the central opening in the main wall to limit radial displacements of the information disc inside the enclosure. The hub is shaped in such a way that in the case of a radial displacement it can abut against the edge of the central opening in the enclosure before the periphery of the information disc can contact any other parts of the enclosure. This effectively prevents the very vulnerable peripheral portion of the information disc from being subject to shocks. This limitation can be provided by elastic means between the hub and the wall of the central opening to absorb shocks between the information disc and the enclosure, thereby reducing the magnitude of the resulting impact forces and also clamping against undesirable sounds.

The elastic means may form part of the enclosure, and need not be rotated together with the information disc. Consequently, they do not contribute to the mass moment of inertia of the information disc, which is important in order to ensure that the rotation can be started and stopped rapidly. Moreover, such elastic means cannot contribute to the unbalance of the information disc. Suitably, the elastic means may comprise elastic portions of the main wall of the enclosure which directly adjoin the central opening in the main wall. As is known many plastics have resilient properties, so that if the enclosure is made of plastic a satisfactory elasticity of the portions of the main wall is achieved by spacing the portions from each other by local openings.

In other embodiments an elastic ring is arranged around the hub or around the central opening. The ring may be made of elastomeric material or if desired a material having distinct damping properties, such as butyl rubber.

The disc is thus protected against radial shocks from contact with parts of the enclosure, and this does not add as much to the cost as movable means arranged in the enclosure provided to immobilise the disc. The drive means do not require any special provisions which would create the necessity of providing a loading mechanism which guarantees the correct sequence of movements.

DETAILED DESCRIPTION OF THE PREFERRED EMBODIMENTS

Figure 1:
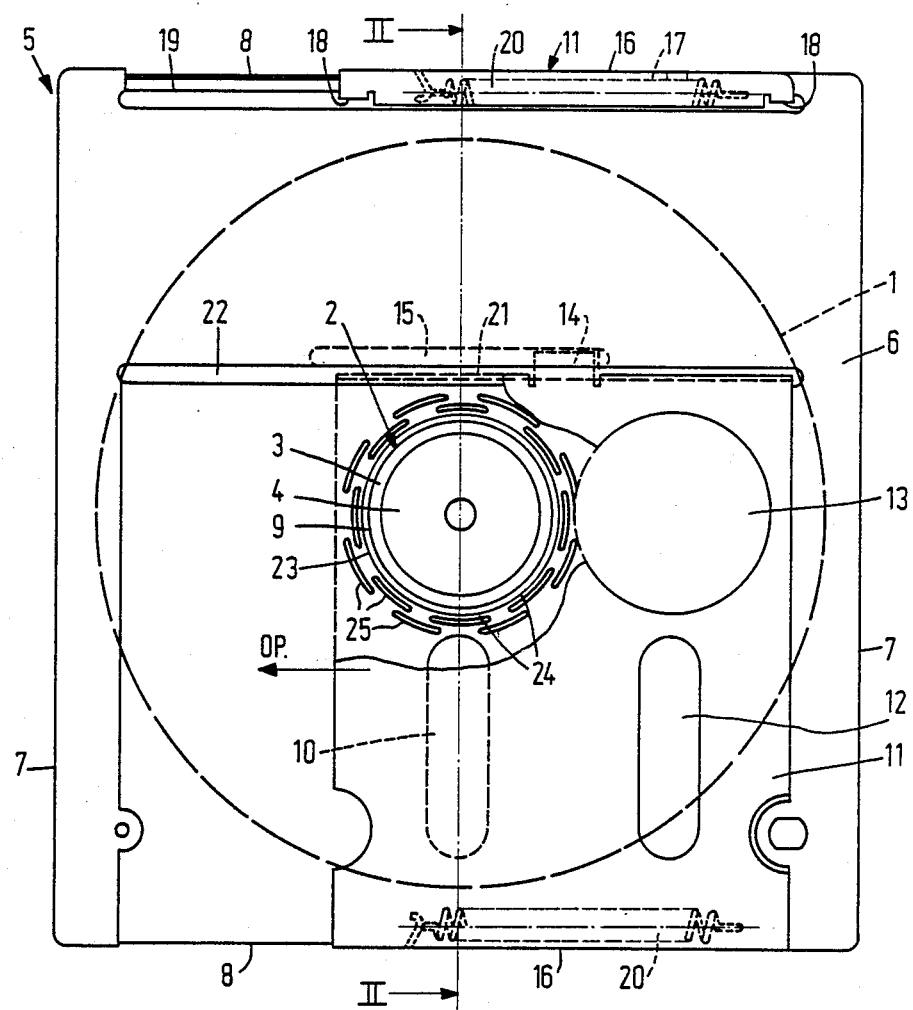
FIG. 1 is an axial view of an the information medium; as described in the afore-mentioned Netherlands Patent.
Figure 2:
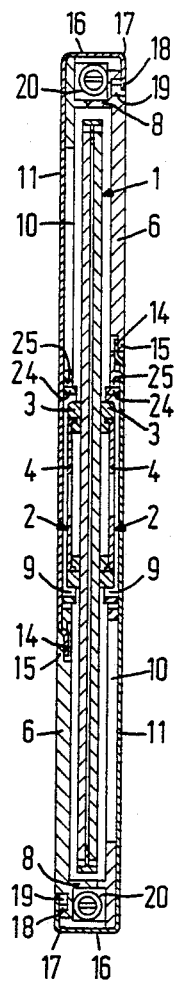
FIG. 2 is a cross-sectional view taken on the lines II—II in FIG. 1.

The information medium shown in FIGS. 1 and 2 comprises an optically readable information disc 1 of a type as described in U. S. Pat. No. 4,074,282 (herewith incorporated by reference), and in U.S. application Ser. No. 700,834. The information disc 1 is readable on both sides and on each side carries a hub 2 to enable it to be driven by a suitable drive means. Each hub has a plastic hub portion 3 and a metal portion 4 which is adapted to cooperate with a magnetic fixing device of the drive apparatus.

The information disc is contained in enclosure 5 comprising identical parallel main walls 6 which are interconnected by two side walls 7 and two side walls 8. Each main wall is formed with a central opening 9 at the location of the hub 2. Further each main wall has a slotshaped opening 10 for the passage of information recording and/or reproducing means of the drive apparatus.

On each side of the enclosure 5 a shutter 11 is arranged so as to be slidable over the exterior of the enclosure 5 between a closed position shown in the drawings and an operational position, not shown. This shutter is formed with a slot 12 corresponding to the slot 10 in the relevant main wall of the enclosure. In the operational position, which is not shown and in which the shutter is shifted to the left in the plan view of FIG. 1, the two slots 10 and 12 are aligned, while in the closed position shown the shutter closes the slot 10.

Each of the two identical shutters 11 extend beyond the central opening 9 in the relevant main wall 6 of the enclosure and each of the shutters 11 is formed with a further opening 13 corresponding to a central opening 9. In the operational position the further opening and the central opening 9 are in register and in the closed position the shutter covers the central opening. In this way the information disc 1 is protected effectively against dust and environmental influences. In the proximity of the central opening 9 the main wall 6 and the shutter 11 are provided with retaining means in the form of tab 14 and edge 15 which, in order to ensure a satisfactory and reliable guidance of the shutter 11, are undercut for a sliding cooperation with each other. The tab 14 which is integral with the shutter 11 and cooperates with edge 15 in the main wall 6. Further guidance is provided by a bent portion 21 of the shutter which engages a slot 22 in the main wall.

An arrow OP in FIG. 1 indicates the direction in which the shutter 11 must be moved from the closed position shown to the operational position. For its guidance each side of the shutter has a side wall 16 which engages around a side wall 8 of the enclosure. The shutter is made of thin metal sheet, so that the required shape of the shutter can readily be obtained by bending. At the side of the facing main wall adjacent the side wall 16 the shutter has a bent-over portion 17 which carries two bent tabs 18. These tabs slide in a slot 19 which is locally provided in the main wall 6. Each shutter 11 is pulled towards the closed position by a tension spring 20.

In order to limit radial displacements of the information disc inside the enclosure, the hub 2 cooperates with the edge 23 of the central opening 9 in the main wall 6. Radial displacements of the hub 2 are limited elastically. This is effected with the aid of the elastic means 24 which belong to the enclosure 5 and which comprise elastic portions of the main wall 6 which directly adjoin the central opening 9 in the main wall. The elastic portions are spaced from each other by local openings in the form of narrow splits 25.

Figure 3:
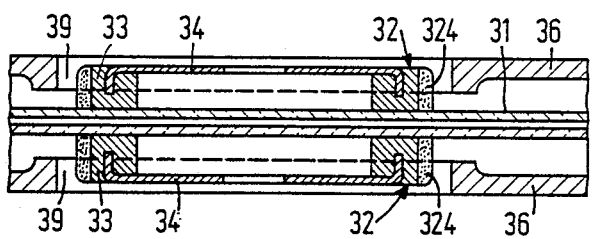
FIG. 3 is an enlarged-scale sectional view showing a part of another embodiment of the invention.

FIG. 3 shows an embodiment in which an optical information disc 31 carries hubs 32 on each side. These hubs each have a plastic portion 33 and a metal portion 34. Each of the hubs is situated in a central opening 39 in a corresponding main wall 36. Each hub is provided with an elastic band 324 for elastically absorbing forces caused by impact between the information disc and the inner wall of the central opening 39.

Figure 4:
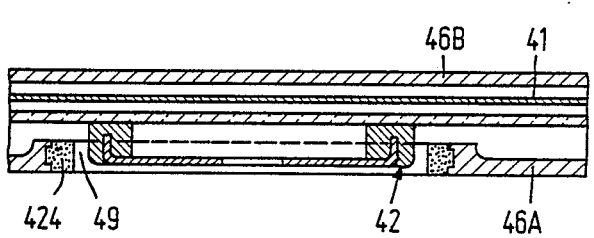
FIG. 4 is a similar enlarged-scale sectional view of a further embodiment of the invention.

FIG. 4 shows an information disc 41 carrying a hub 42 on one side only. This hub is situated on a major wall 46A, the other major wall 46B being inperforate. An elastic ring 424 rigidly connected to the main wall 46A forms part of the enclosure.

What is claimed is:

1. An information medium for reception in a drive unit having a spindle for rotary drive of an information disc, said medium comprising,
    an information disc having a hub fixed centrally thereto for cooperating with said drive spindle,
    an enclosure for the information disc, said enclosure comprising a main wall formed with a circular central opening in which said hub is received with some radial clearance between said hub and periphery of said opening whether or not said medium is in a playing mode in said drive unit, and
    elastic means for resiliently limiting radial displacement of said hub relative to said enclosure.

2. An information medium as claimed in claim 1, characterized in that the elastic means comprise an elastic ring which is fitted in the main wall of the enclosure at the edge of the central opening.

3. An information medium as claimed in claim 1, charaterized in that the elastic means form part of the enclosure.

4. An information medium as claimed in claim 3, characterized in that the elastic means comprise elastic portions of the main wall of the enclosure which directly adjoin the central opening in the main wall.

5. An information medium as claimed in claim 4, characterized in that the elastic portions are spaced from each other by local opening.

6. An information medium as claimed in claim 1, characterized in that the elastic means comprise an elastic ring on the circumference of the hub.

* * * * *